Jan. 13, 1953 W. BAASNER ET AL 2,625,075
PHOTOGRAPHIC ENLARGER

Filed May 22, 1950 2 SHEETS—SHEET 1

INVENTORS
WILHELM BAASNER
KARL HUBER
BY
Connolly and Hutz
THEIR ATTORNEYS

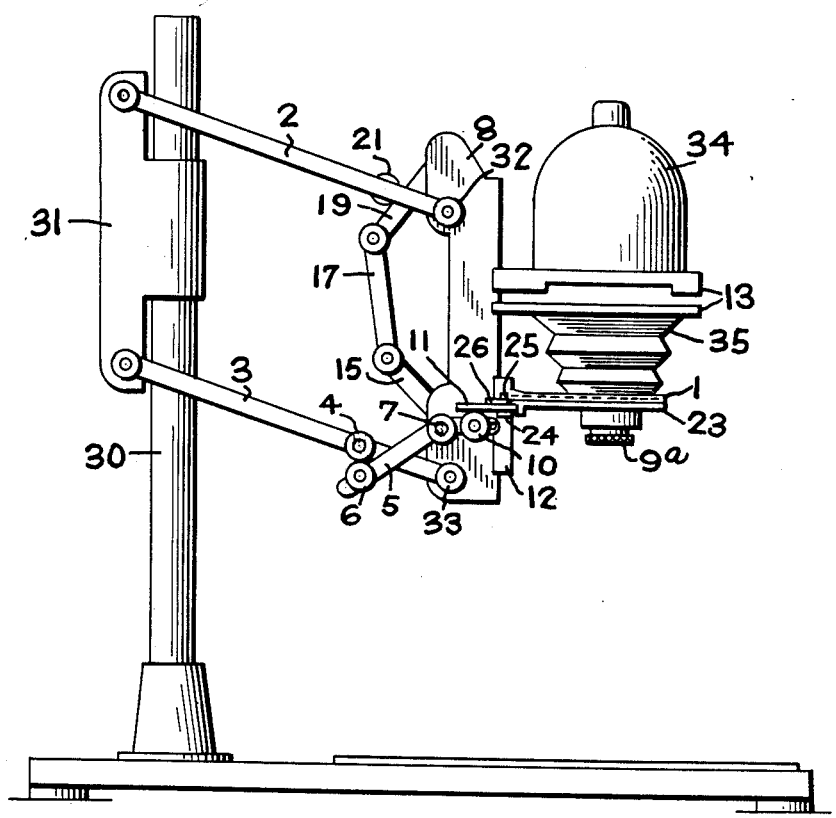

Patented Jan. 13, 1953

2,625,075

UNITED STATES PATENT OFFICE 2,625,075

PHOTOGRAPHIC ENLARGER

Wilhelm Baasner and Karl Huber, Munich, Germany

Application May 22, 1950, Serial No. 163,454
In Germany May 19, 1949

3 Claims. (Cl. 88—24)

1

The invention relates to a photographic enlarger whose picture projection head is seated vertically in a double parallelogram rod system that is affixed at one end to the frame of the enlarger and at the other end to a slidable member on a supporting column. The automatic focussing of the lens is accomplished in this apparatus by means of a system of levers including an angle lever whose motion is controlled by a point on the parallelogram.

It has already been suggested in the case of such an apparatus to substitute the lens by another having a different focal length and to provide for each lens a special system of levers. Depending upon the focal length of the particular lens employed, it was necessary by means of a pusher or the like to connect the corresponding lever system to the lens carrier by hand.

The principal object of this invention is to improve such an apparatus further and to enlarge its effectiveness. According to the invention the lens carriers automatically and necessarily form the connection to the corresponding angle lever system, when they are inserted into the enlarger. The automatic coupling between the lever system and the lens carrier is produced, for example, by one fixed and at least one movable shoulder on the lens carrier. These are guided by the variously formed lens boards in such a manner that in each case only one shoulder lies within the zone of movement of a steering roller on the corresponding angle lever system. According to the invention the lens boards possess various cut-out portions or appendages which, upon insertion into the lens carrier, may direct the proper movable steering shoulder against the action of a spring into the zone of movement of the steering roller of the lever system corresponding to the lens employed. The lens carrier slide is slidably conducted along the frame of the enlarger and, in consequence of its own weight, rests with the particular steering shoulder that is brought into position against the steering roller of the corresponding lever system, i. e. it is thus connected to the system in a motion terminating manner.

Without changing the inventive concept, it is also possible to provide more than two shoulders at the lens carrier and to couple each of these with a separate angle lever system.

Figure 1:
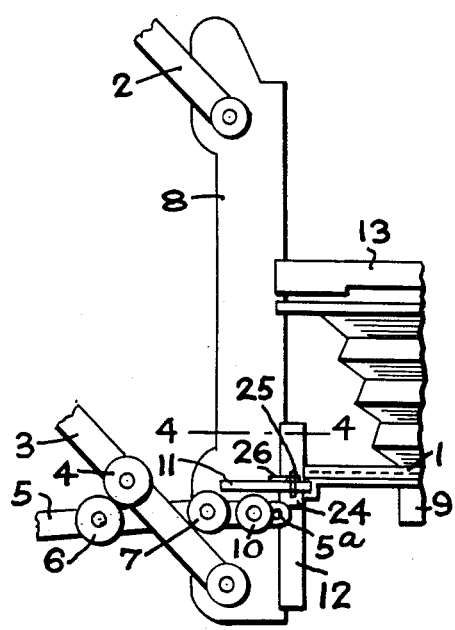

In the accompanying drawings there is shown by way of example one embodiment of the invention. In these drawings:

Fig. 1 is a partial side view of the enlarger wherein a lens of short focal length is coupled with the angle lever system,

2

Figure 2:
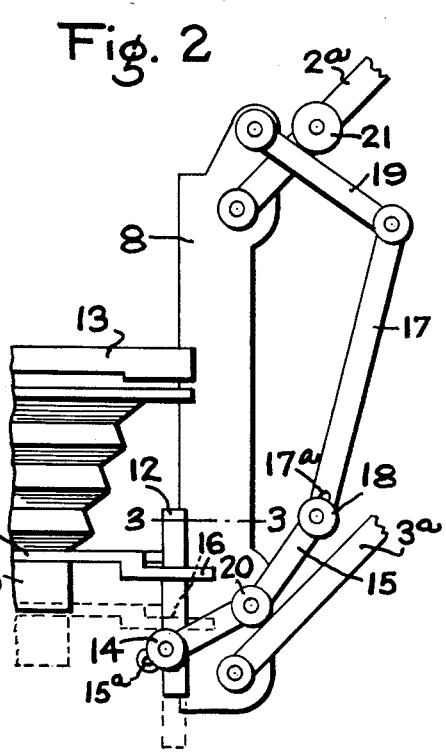
Figure 4:
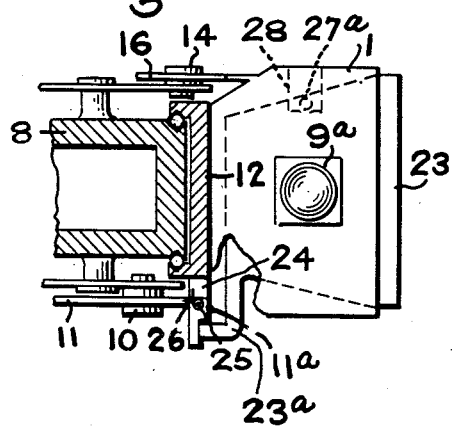
Figure 3:
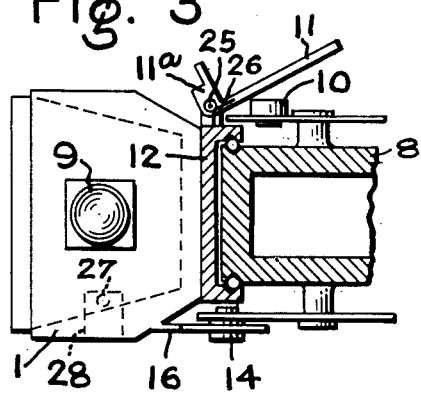

Fig. 2 represents a part of the enlarger of Fig. 1 seen from the opposite side, and the position of the lever system when employing a lens of long focal length is indicated therein by broken lines, Fig. 3 is a top view of a section of the enlarger along the line 3—3 of Fig. 2, when employing a normal lens (long focal length), Fig. 4 is a top view of a section along the line 4—4 of Fig. 1, when employing a lens having an abnormal focal length, Fig. 5 is a side view of the complete enlarger.

The enlarger illustrated particularly in Fig. 5 includes a base plate 29, a column 30 and a supporting member 31 slidably arranged upon the latter. To this supporting member there are affixed the parallel arms of the double parallelogram rod system. The parallel links 2 and 3 on one side of the apparatus are shown in Figs. 1 and 5, while the corresponding links 2a and 3a at the opposite side of the apparatus are shown in Fig. 2. These links 2, 2a, 3 and 3a form the double parallelogram rod system to which is attached a frame 8 that holds the negative carrier 13 which in turn carries the lamp housing 34 and the bellows 35. The lens 9a, a lens board 23 and a lens carrier 1 are slidably supported by the frame 8 through the medium of the lens carrier slide 12. Each pair of parallel links is connected to a separate angle lever system, each of which may be employed to steer the lens carrier 1 and provide automatic focussing, as will be described hereinafter.

Referring particularly to Fig. 1 of the drawings, the parallelly disposed links 2 and 3 of the double parallelogram rod system (partly shown) are used to steer the lens carrier 1, when a lens of short focal length is employed. The lower link 3 is in contact with the angle lever 5 by means of the roller 4. A roller 6 is preferably employed as the contact point, in order to produce the least possible friction between the contact points, and to enable the angle lever 5 to be regulated within the widest possible limits. The angle lever 5 is rotatable about the pin 7, that is mounted on the frame 8. A steering roller 10 is arranged on the end 5a of the angle lever 5, that is nearest the lens 9, which steering roller rests against a swingable shoulder 11 of the lens carrier slide 12. In consequence of the weight of the lens carrier slide 12 and the lens 9, this swingable shoulder 11 rests upon the steering roller 10, when in the position shown in Figs. 1 and 4, and thus takes part in every movement of the steering roller.

On the other side of the apparatus (see Fig. 2) the corresponding links 2a and 3a of the parallelogram and another lever system 15 to 20, inclusive, steer the lens carrier 1, when a normal lens of longer focal length is used. The focussing for the lens of greatest focal length employed is so chosen, that the steering roller 14 on the angle lever 15 always precedes the steering roller 10 on the angle lever 5. It may be seen from Fig. 2 to what extent the lens carrier 1 must be further raised, if a lens of shorter focal length is to be employed. The position of the fixed striking shoulder 16, when employing the normal lens (long focal length), is indicated by broken lines in Fig. 2. The end of the angle lever 15 closest to the lens is designated by the reference number 15a. The ends 5a and 15a of the angle levers 5 and 15 are provided with slots, in order to be able to adjust to a far reaching extent the positions of the steering rollers 10 and 14, in accordance with the tolerances of the particular lens employed. The same purpose is served by the slot 17a in the lever 17 at the joint 18 of the steering system 15, 17, 19. The turning pin for the angle lever 15, that is mounted on the frame 8 of the apparatus, bears the reference number 20.

It must still be emphasized that the lever system 15, 17, 19 for steering of the fixed shoulder 16, when using the lens of normal focal length, is steered by the upper link 2a of the double parallelogram rod system, and that the roller 21 of the link 2a rests against the lever 19 of the lever system and also changes the position of the lever system 15, 17, 19 and therewith the position of the lens carrier 1, depending upon the position of the frame 8.

The lens board 22 that carries a lens 9 of normal (in this case the longest) focal length, possesses the form shown in Fig. 3, while the lens board 23, that carries a lens 9a of shorter focal length, possesses an appendage 23a by means of which the adjustable and, as illustrated, swingable shoulder 11 is automatically brought into the ready position (see Fig. 4) upon insertion of the objective board 23. The shoulder 11 that is swingable about the mounting eye 24 is always urged into the position shown in Fig. 3 by a spiral spring 26 arranged on the turning pin 25, i. e. it is normally held out of engagement with the steering roller 10. Upon insertion of the lens board 23, however, the appendage 23a presses the arm 11a of the shoulder 11 into the position shown in Fig. 4 whereby the shoulder 11 comes to rest against the steering roller 10. In this position the fixed shoulder 16 does not rest against the steering roller 14 as might appear from Fig. 4, but actually it is at some distance above the steering roller. It is held in this position (see Fig. 2) by shoulder 11 that rests against the steering roller 10 on the other side of the enlarger.

In order to lock the lens boards 22 and 23 into position, catch 28 is provided on the lens carrier 1 into which a corresponding protuberance 27, 27a on the objective lens boards 22, 23 catches resiliently.

There is claimed:

1. A photographic enlarger, comprising a frame, a lens carrier having two shoulders and slidable within said frame, a base plate, a column, a support slidably arranged on the column, a system of two pairs of parallel rods swingably joining said support and said frame, one rod of the first pair of parallel rods being connected to a first angle lever pivoted on the frame, said angle lever having a roller at one of its ends bearing against one shoulder of the lens carrier and bearing with its other end against a roller on a rod of the first pair of parallel rods, a second angle lever having one of its ends attached to the frame by means of a connecting rod and a lever pivoted on the frame, said lever bearing against a roller on a rod of the second pair of parallel rods, the other end of the second angle lever bearing against the second shoulder of the lens carrier, two lens boards for alternate insertion into said lens carrier, each of said boards supporting a lens of different focal length, means on said lens boards for alternately coupling a different one of said shoulders with its associated angle lever, thereby automatically varying the focal distance between the lens and the base plate.

2. An enlarger as claimed in claim 1, wherein one shoulder is fixedly attached to the lens carrier and the second shoulder is swingably arranged thereon, said second shoulder being normally held out of engagement with the steering roller on the first angle lever by the action of a spring.

3. An enlarger as claimed in claim 2, comprising means on one of the lens boards, which means upon insertion of said lens board into the lens carrier bears against the swingable shoulder on the latter to couple it with the steering roller on the first angle lever.

WILHELM BAASNER.
KARL HUBER.

REFERENCES CITED

The following references are of record in the file of this patent:

UNITED STATES PATENTS

| Number | Name | Date |
| --- | --- | --- |
| 2,043,970 | Luz | June 9, 1936 |